(12) United States Patent
Guastella et al.

(10) Patent No.: US 11,205,143 B2
(45) Date of Patent: Dec. 21, 2021

(54) UTILIZING A MACHINE LEARNING MODEL AND NATURAL LANGUAGE PROCESSING TO MANAGE AND ALLOCATE TASKS

(71) Applicant: Accenture Global Solutions Limited, Dublin (IE)

(72) Inventors: Fabiano Jose Daniek Guastella, São Paulo (BR); Leomar Oliveira Dias Filho, São Paulo (BR); Eduardo Fernandes De Olveira, São Paulo (BR); Laila Rothe Andrade, São Paulo (BR); Renato Tavares Da Silva, São Paulo (BR); Mardoqueu Souza Vieira, São Paulo (BR); Leonardo Valeriano Neri, Pernambuco (BR); Jamisson Santana Freitas, Pernambuco (BR)

(73) Assignee: Accenture Global Solutions Limited, Dublin (IE)

( * ) Notice: Subject to any disclaimer, the term of this patent is extended or adjusted under 35 U.S.C. 154(b) by 2 days.

(21) Appl. No.: 16/275,195

(22) Filed: Feb. 13, 2019

(65) Prior Publication Data
US 2019/0258985 A1    Aug. 22, 2019

Related U.S. Application Data

(60) Provisional application No. 62/710,301, filed on Feb. 16, 2018.

(51) Int. Cl.
*G06Q 10/06*    (2012.01)
*G06N 3/08*    (2006.01)
(Continued)

(52) U.S. Cl.
CPC ..... *G06Q 10/063112* (2013.01); *G06F 40/30* (2020.01); *G06N 3/08* (2013.01); *G06Q 10/063114* (2013.01); *G06F 40/40* (2020.01)

(58) Field of Classification Search
CPC .... G06Q 10/063112; G06Q 10/063114; G06F 40/30; G06F 40/40; G06N 3/08
See application file for complete search history.

(56) References Cited

U.S. PATENT DOCUMENTS

| 8,543,438 B1 | 9/2013 | Fleiss | |
| 2007/0106496 A1 * | 5/2007 | Ramsey | G06F 40/284 704/9 |

(Continued)

OTHER PUBLICATIONS

Flexible Online Task Assignment in Real-Time Spatial Data; Tong, Yongxin; (Year: 2017).*

*Primary Examiner* — Timothy Padot
*Assistant Examiner* — Francis Z. Santiago Merced
(74) *Attorney, Agent, or Firm* — Harrity & Harrity, LLP

(57) ABSTRACT

A device trains a machine learning model with historical productivity data and skills data to generate a trained machine learning model that determines allocations of tasks to workers. The device receives new task data identifying new tasks to allocate to the workers and performs natural language processing on the new task data to convert the new task data to processed new task data. The device receives, from sensors associated with the workers, real-time productivity data identifying productivity of the workers in completing current tasks assigned to the workers. The device processes the processed new task data and the real-time productivity data, with the trained machine learning model, to determine allocations of the new tasks to the workers, and causes the new tasks to be allocated to the workers by one or more devices and based on the determined allocations of the new tasks.

20 Claims, 14 Drawing Sheets

(51) Int. Cl.
*G06F 40/30* (2020.01)
*G06F 40/40* (2020.01)

(56) References Cited

U.S. PATENT DOCUMENTS

| | | | |
|---|---|---|---|
| 2009/0006164 A1* | 1/2009 | Kaiser | G06Q 10/063112 |
| | | | 705/7.14 |
| 2010/0153160 A1 | 6/2010 | Bezemer et al. | |
| 2011/0213634 A1* | 9/2011 | Karakey | G06Q 10/06 |
| | | | 705/7.14 |
| 2012/0054764 A1* | 3/2012 | Bagheri | G06Q 10/063112 |
| | | | 718/104 |
| 2014/0297548 A1* | 10/2014 | Wilner | G06Q 10/1053 |
| | | | 705/321 |
| 2015/0178637 A1* | 6/2015 | Bogojeska | G06N 5/04 |
| | | | 706/12 |
| 2015/0339572 A1* | 11/2015 | Achin | G06F 9/5011 |
| | | | 706/46 |
| 2016/0162478 A1* | 6/2016 | Blassin | G06Q 10/06311 |
| | | | 706/12 |
| 2016/0171633 A1* | 6/2016 | DeWalt | G06Q 10/063114 |
| | | | 705/7.15 |
| 2017/0140322 A1* | 5/2017 | Kozloski | G06Q 10/063112 |
| 2017/0200101 A1* | 7/2017 | Kumar | G06N 5/003 |
| 2017/0249574 A1* | 8/2017 | Knijnik | G06Q 10/06314 |
| 2018/0039526 A1* | 2/2018 | Mulla | H04L 41/5051 |
| 2019/0025773 A1* | 1/2019 | Yang | G06N 3/0454 |

\* cited by examiner

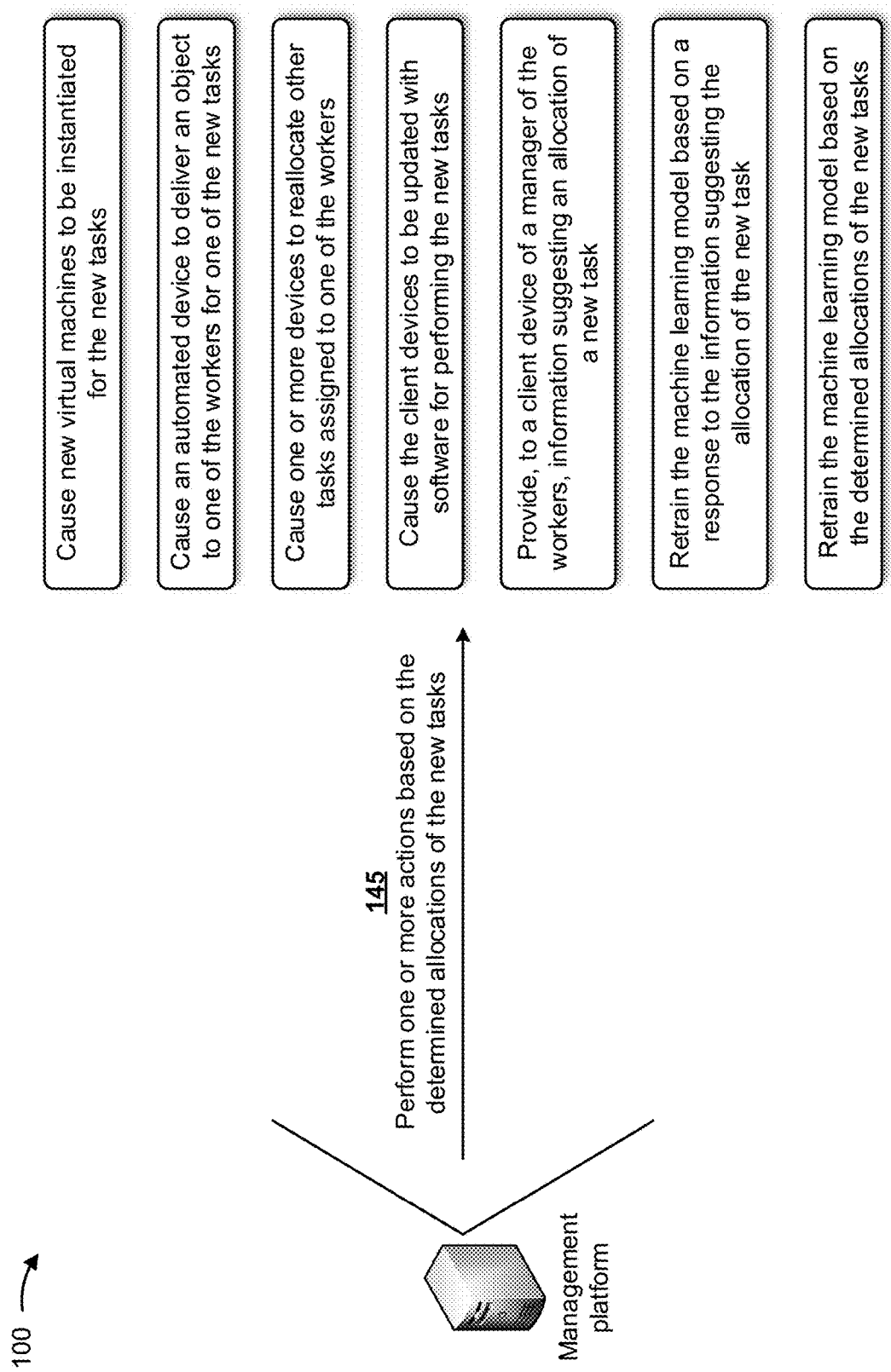

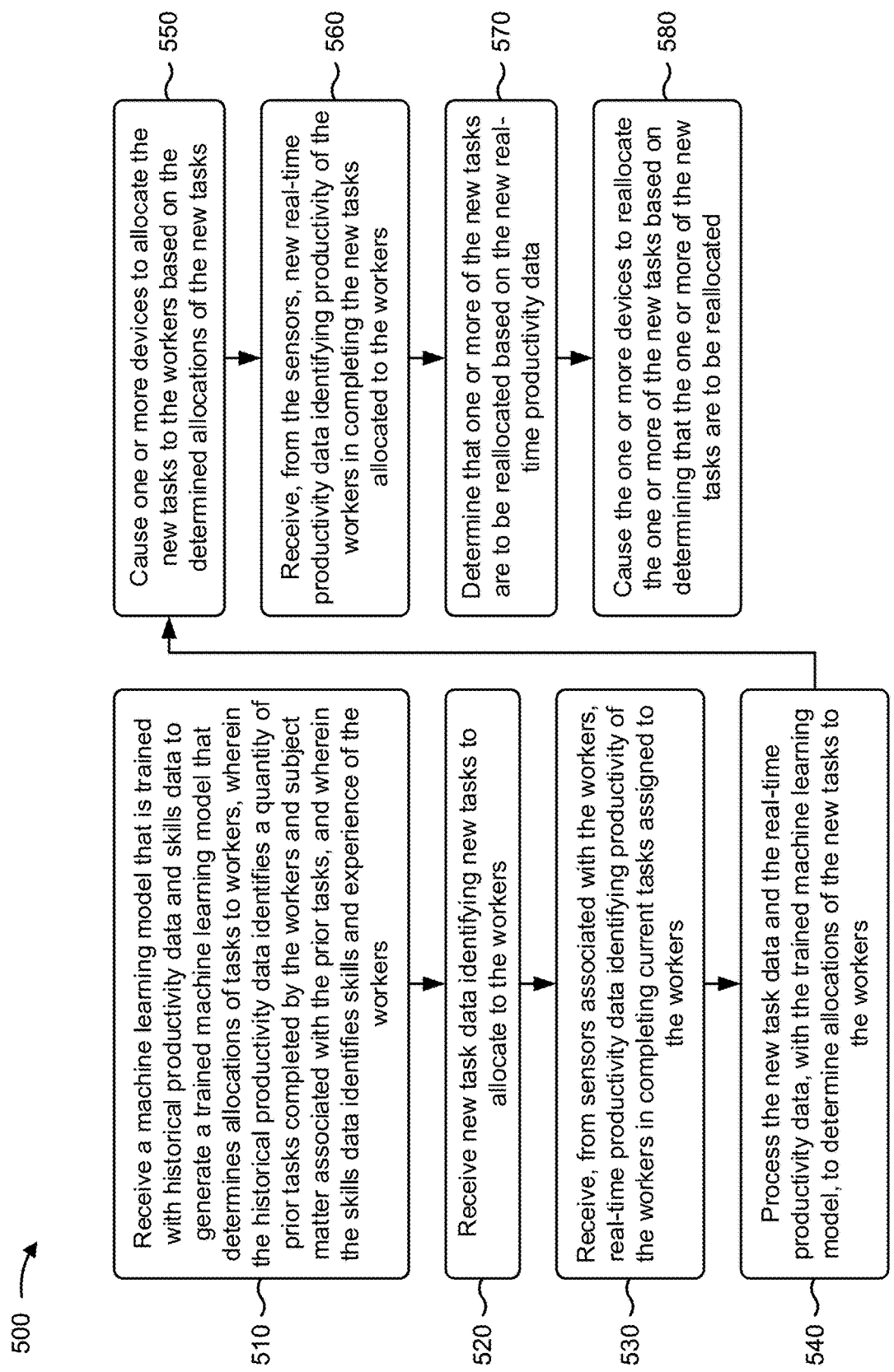

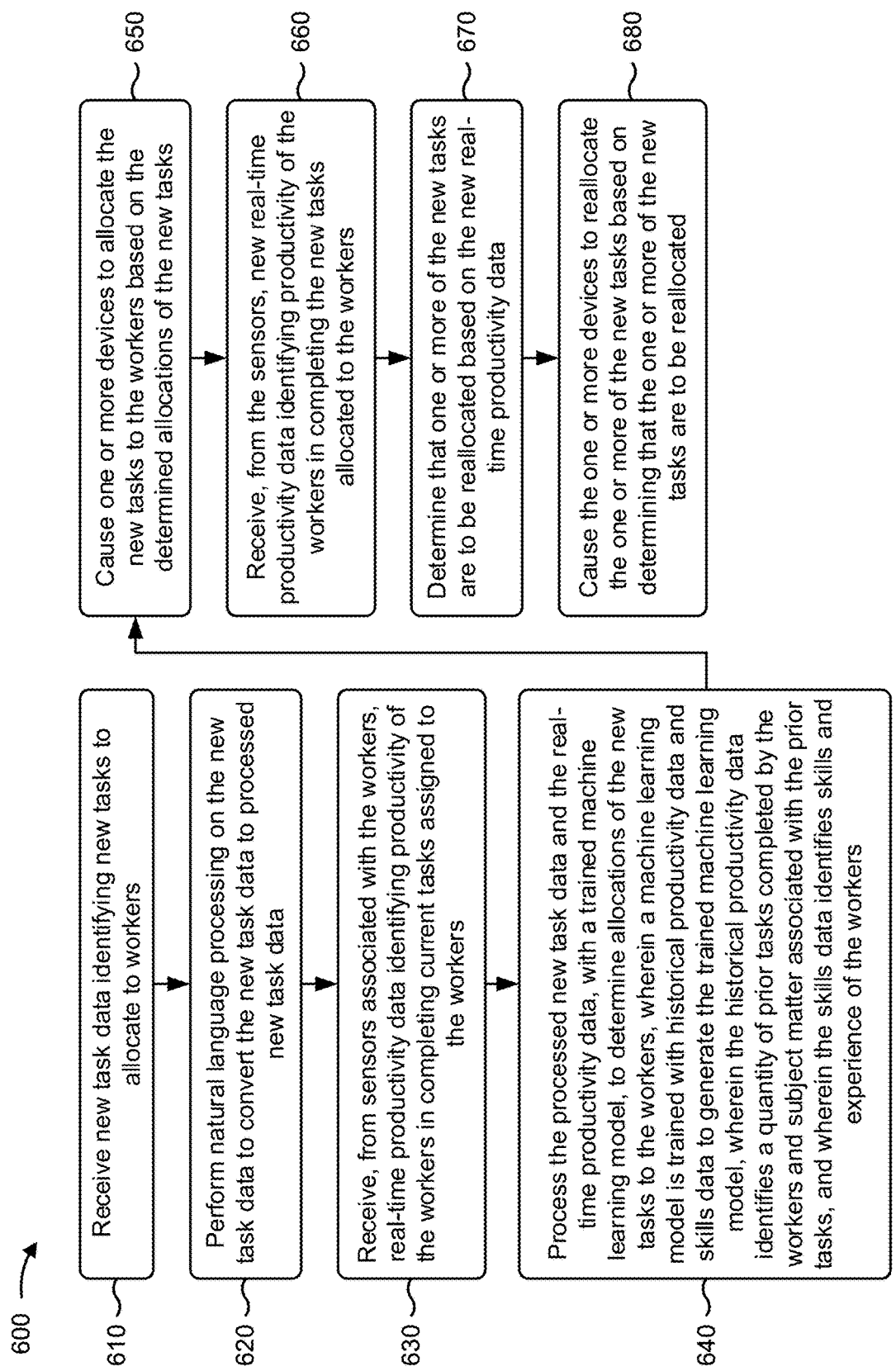

UTILIZING A MACHINE LEARNING MODEL AND NATURAL LANGUAGE PROCESSING TO MANAGE AND ALLOCATE TASKS

RELATED APPLICATION

This application claims priority under 35 U.S.C. § 119 to U.S. Provisional Patent Application No. 62/710,301, filed on Feb. 16, 2018, the content of which is incorporated by reference herein in its entirety.

BACKGROUND

Managing a team of workers (e.g., employees, contractors, analysts, and/or the like) requires task allocation to each worker on the team. This requires making decisions about which worker is capable of successfully performing specific tasks daily, weekly, monthly, and/or the like. To make these decisions effectively, a team leader must make judgments concerning one or more tasks that must be completed, which workers are able to complete the tasks, and/or the like.

SUMMARY

In some aspects, a method may include training a machine learning model with historical productivity data and skills data to generate a trained machine learning model that determines allocations of tasks to workers, wherein the historical productivity data may identify a quantity of prior tasks completed by the workers and subject matter associated with the prior tasks, and wherein the skills data may identify skills and experience of the workers. The method may include receiving new task data identifying new tasks to allocate to the workers, and performing natural language processing on the new task data to convert the new task data to processed new task data. The method may include receiving, from sensors associated with the workers, real-time productivity data identifying productivity of the workers in completing current tasks assigned to the workers, and processing the processed new task data and the real-time productivity data, with the trained machine learning model, to determine allocations of the new tasks to the workers. The method may include causing the new tasks to be allocated to the workers by one or more devices and based on the determined allocations of the new tasks.

In some aspects, a device may include one or more memories and one or more processors, communicatively coupled to the one or more memories, to receive a machine learning model that is trained with historical productivity data and skills data to generate a trained machine learning model that determines allocations of tasks to workers, wherein the historical productivity data may identify a quantity of prior tasks completed by the workers and subject matter associated with the prior tasks, and wherein the skills data may identify skills and experience of the workers. The one or more processors may receive new task data identifying new tasks to allocate to the workers, and may receive, from sensors associated with the workers, real-time productivity data identifying productivity of the workers in completing current tasks assigned to the workers. The one or more processors may process the new task data and the real-time productivity data, with the trained machine learning model, to determine allocations of the new tasks to the workers, and may cause one or more devices to allocate the new tasks to the workers based on the determined allocations of the new tasks. The one or more processors may receive, from the sensors, new real-time productivity data identifying productivity of the workers in completing the new tasks allocated to the workers, and may determine that one or more of the new tasks are to be reallocated based on the new real-time productivity data. The one or more processors may cause the one or more devices to reallocate the one or more of the new tasks based on determining that the one or more of the new tasks are to be reallocated.

In some aspects, a non-transitory computer-readable medium may store instructions that include one or more instructions that, when executed by one or more processors of a device, cause the one or more processors to receive new task data identifying new tasks to allocate to workers, and perform natural language processing on the new task data to convert the new task data to processed new task data. The one or more instructions may cause the one or more processors to receive, from sensors associated with the workers, real-time productivity data identifying productivity of the workers in completing current tasks assigned to the workers, and process the processed new task data and the real-time productivity data, with a trained machine learning model, to determine allocations of the new tasks to the workers. A machine learning model may be trained with historical productivity data and skills data to generate the trained machine learning model, wherein the historical productivity data may identify a quantity of prior tasks completed by the workers and subject matter associated with the prior tasks, and wherein the skills data may identify skills and experience of the workers. The one or more instructions may cause the one or more processors to cause one or more devices to allocate the new tasks to the workers based on the determined allocations of the new tasks, and receive, from the sensors, new real-time productivity data identifying productivity of the workers in completing the new tasks allocated to the workers. The one or more instructions may cause the one or more processors to determine that one or more of the new tasks are to be reallocated based on the new real-time productivity data, and cause the one or more devices to reallocate the one or more of the new tasks based on determining that the one or more of the new tasks are to be reallocated.

BRIEF DESCRIPTION OF THE DRAWINGS

FIGS. 1A-1I are diagrams of an example implementation described herein.

FIGS. 4-6 are flow charts of example processes for utilizing a machine learning model and natural language processing to manage and allocate tasks.

DETAILED DESCRIPTION

Figure 1A:
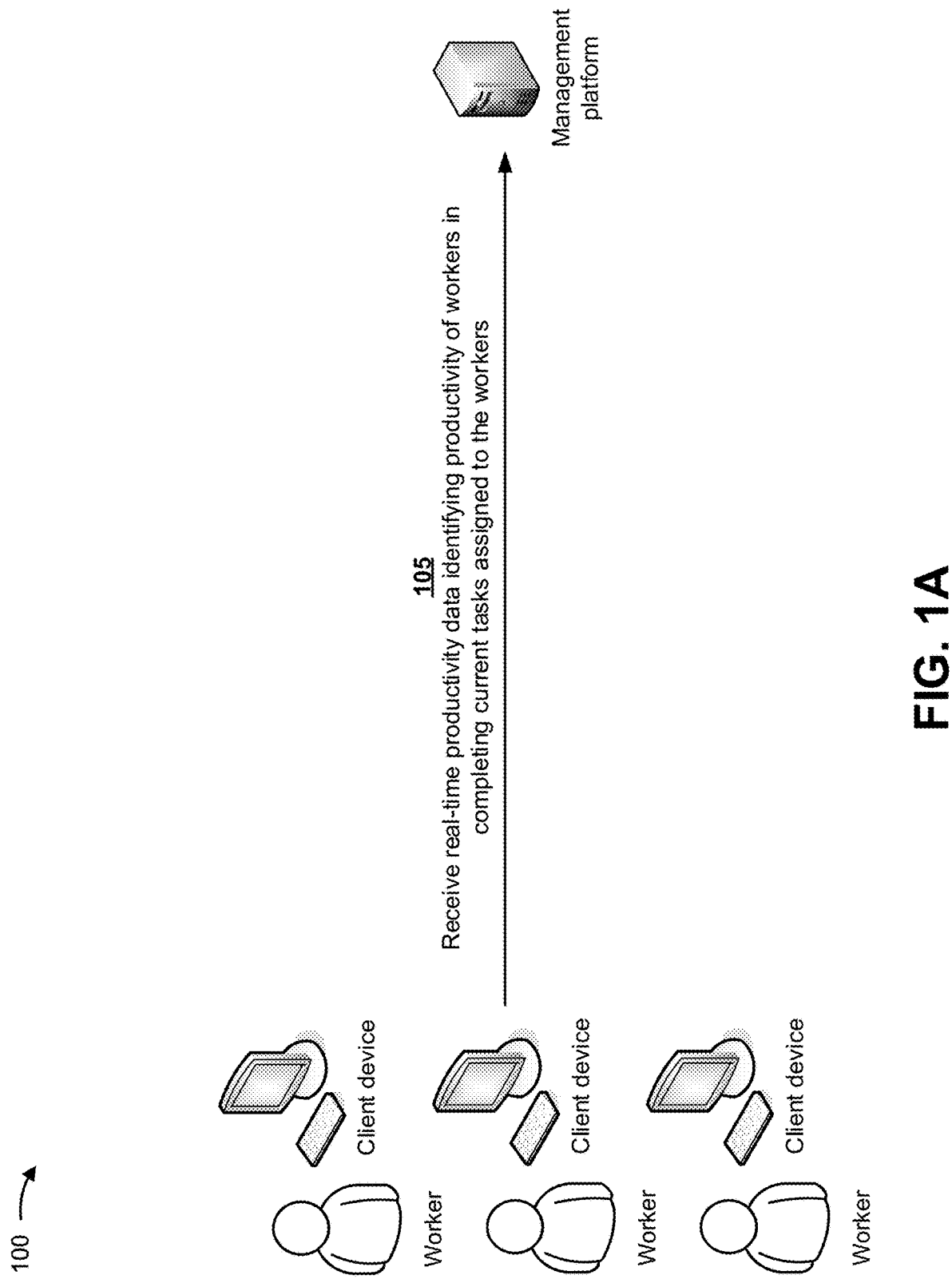

The following detailed description of example implementations refers to the accompanying drawings. The same reference numbers in different drawings may identify the same or similar elements.

A team leader will often have multiple tasks to allocate to different workers of a team. Sometimes a project may require one task to be completed before work can begin on other tasks. Knowledge of competence levels of workers ensures that a project is staffed accurately. In some situations, the team leader can manually use a skills matrix that provides a visual depiction of worker skills. The skills matrix presents a useful way of considering what each worker does well, and provides an indication of areas where professional development is required for the workers.

Many entities have a very large workforce (e.g., a large quantity of workers) and may store thousands, millions, billions, etc., of data points identifying skillsets of the workers, languages spoken by the workers, working hours of the workers, locations of the workers, projects worked on by the workers in the past, ratings indicating performance of the workers on the projects, which workers have worked together before and ratings for those workers on projects (e.g., projects worked out well when two particular workers work together), personality type information of the workers, and/or the like. Allocating tasks based on such a volume of data points is not capable of being done in the human mind and is so complex that traditional data processing applications cannot be used.

If traditional data processing applications are used to allocate tasks, such task allocations result in inefficient, time consuming, and error prone utilization of computing resources (e.g., processing resources, memory resources, and/or the like), networking resources, and/or the like. For example, the traditional data processing applications may incorrectly allocate tasks to workers, which may result in the tasks not being completed or not being completed correctly. This causes computing resources, networking resources, and/or the like, to be wasted allocating tasks incorrectly, attempting to complete incomplete tasks, revising incorrectly completed tasks, delaying completion of a project, and/or the like.

Some implementations described herein provide a management platform that utilizes a machine learning model and natural language processing to manage and allocate tasks. For example, the management platform may train a machine learning model with historical productivity data and skills data to generate a trained machine learning model that determines allocations of tasks to workers. The historical productivity data may identify a quantity of prior tasks completed by the workers and subject matter associated with the prior tasks, and the skills data may identify skills and experience of the workers. The management platform may receive new task data identifying new tasks to allocate to the workers, and may perform natural language processing on the new task data to convert the new task data to processed new task data. The management platform may receive, from sensors associated with the workers, real-time productivity data identifying productivity of the workers in completing current tasks assigned to the workers, and may process the processed new task data and the real-time productivity data, with the trained machine learning model, to determine allocations of the new tasks to the workers. The management platform may cause the new tasks to be allocated to the workers by one or more devices and based on the determined allocations of the new tasks.

In this way, the management platform may handle thousands, millions, billions, and/or the like, of task allocations within a period of time (e.g., daily, weekly, monthly), and thus may provide "big data" capability. Furthermore, the management platform reduces incorrectly allocated tasks, incomplete tasks, incorrectly completed tasks, and/or the like, and conserves computing resources, networking resources, and/or the like that would otherwise be wasted allocating tasks incorrectly, identifying incomplete tasks and/or incorrectly completed tasks, attempting to complete incomplete tasks, revising incorrectly completed tasks, delaying completion of a project, and/or the like.

FIGS. 1A-1I are diagrams of an example implementation 100 described herein. As shown in FIG. 1A, workers may be associated with client devices and a management platform. The workers may perform work on current tasks (e.g., with or without the client devices) allocated to them. In some implementations, tasks may include performance of a service by the workers, performance of manual labor by the workers, and/or the like. For example, if the workers are associated with a call center, the tasks may include handling of calls received at the call center.

While working on the current tasks, real-time productivity data of the workers may be monitored by the client devices. The real-time productivity data may identify real-time or near real-time productivity of the workers in completing the current tasks assigned to workers, such as a quantity of tasks completed by the workers, a quantity of tasks left to complete by the workers, subject matter associated with the tasks, and/or the like. In some implementations, the client devices may include computing devices that monitor the real-time productivity data (e.g., track completion of the current tasks in real time), sensors (e.g., biometric sensors, video cameras, and/or the like) that monitor the real-time productivity data, telephones that monitor the real-time productivity data, and/or the like.

As further shown in FIG. 1A, and by reference number 105, the management platform may receive, from the client devices, the real-time productivity data identifying the productivity of the workers in completing the current tasks assigned to the workers. In some implementations, the management platform may store the real-time productivity data in a data structure (e.g., a database, a table, a list, and/or the like).

Figure 1B:
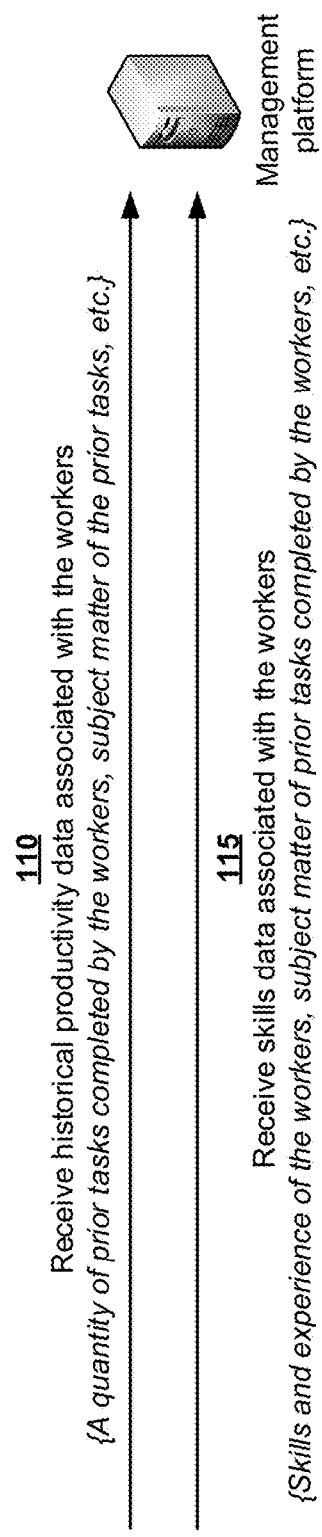

As shown in FIG. 1B, and by reference number 110, the management platform may receive historical productivity data associated with the workers. In some implementations, the management platform may receive the historical productivity data from the client devices, from a data structure (e.g., a database, a table, a list, and/or the like) associated with the management platform, from a server device associated with the management platform, and/or the like. In some implementations, the historical productivity data may include thousands, millions, billions, etc., of data points identifying quantities of prior tasks completed by each of the workers over a time period (e.g., daily, weekly, monthly, and/or the like), subject matter associated with the prior tasks, and/or the like.

As further shown in FIG. 1B, and by reference number 115, the management platform may receive skills data associated with the workers. In some implementations, the management platform may receive the skills data from the client devices, from a data structure (e.g., a database, a table, a list, and/or the like) associated with the management platform, from a server device associated with the management platform, and/or the like. In some implementations, the skills data may include thousands, millions, billions, etc., of data points identifying skills associated with each of the workers, subject matter associated with the prior tasks completed by each of the workers, education levels associated with each of the workers, years of experience (e.g., performing tasks) associated with each of workers, and/or the like.

Figure 1C:
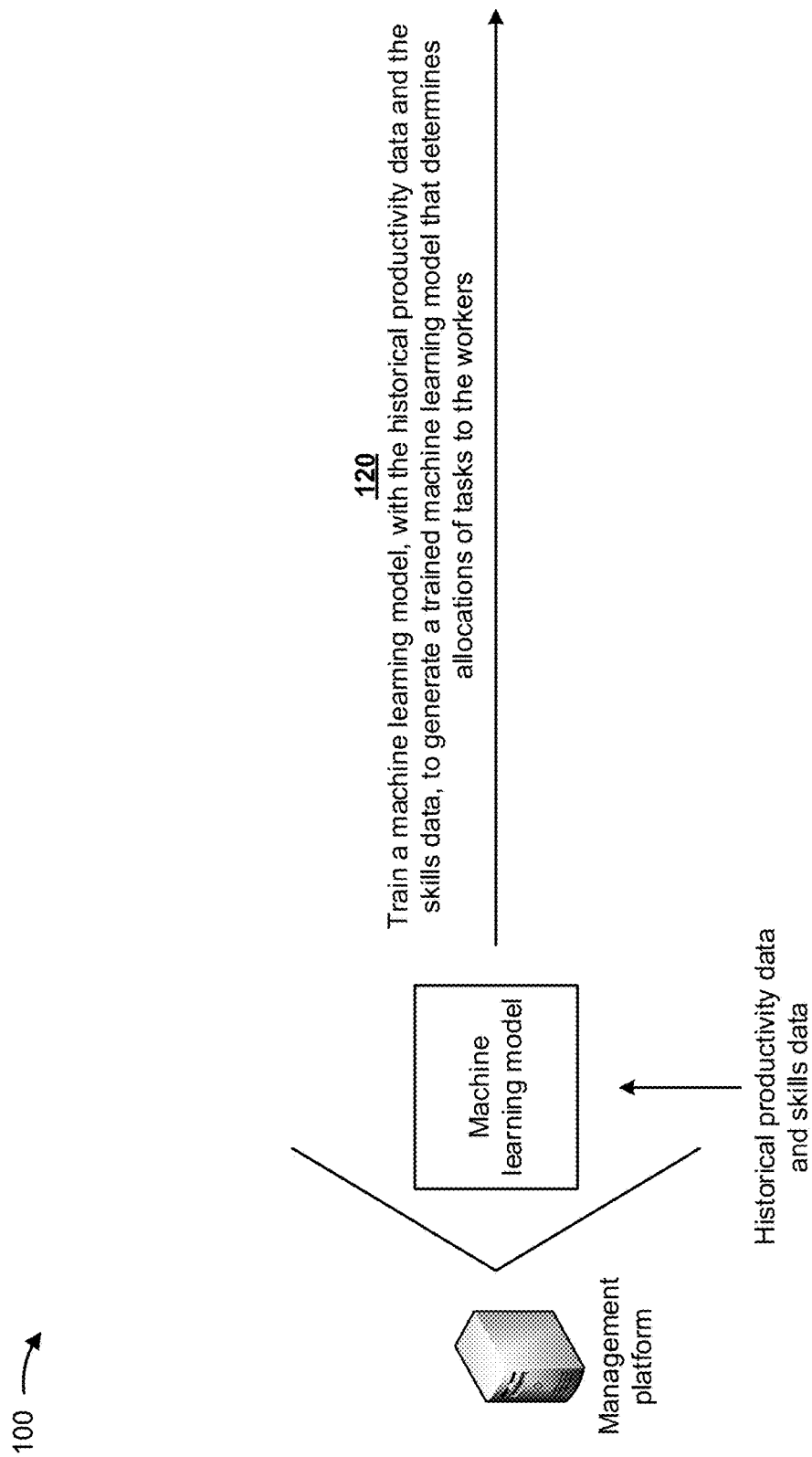

As shown in FIG. 1C, and by reference number 120, the management platform may train a machine learning model, with the historical productivity data and the skills data, to generate a trained machine learning model that determines allocations of tasks to the workers. In some implementations, the machine learning model may include a prediction model that ensures allocation of particular collateral to particular exposures, considers future probabilities associated with collateral, provides a more optimized collateral allocation, and/or the like. In some implementations, the machine learning model may include a random forest model, a support vector machine model, an artificial neural network model, a lasso regression model, a data mining model, a frequent rule mining model, a pattern discovery model, and/or one or more combinations of the aforementioned models.

In some implementations, the management platform may perform a training operation on the machine learning model with the historical productivity data and the skills data. For example, the management platform may separate the historical productivity data and the skills data into a training set, a validation set, a test set, and/or the like. The training set may be utilized to the train the machine learning model. The validation set may be utilized to validate is predicted to result of the trained machine learning model. The test set may be utilized to test operation of the machine learning model. In some implementations, the management platform may train the machine learning model using, for example, an unsupervised training procedure and based on the training set of the historical productivity data and the skills data. For example, the management platform may perform dimensionality reduction to reduce the historical productivity data and the skills data to a minimum feature set, thereby reducing resources (e.g., processing resources, memory resources, and/or the like) to train the machine learning model, and may apply a classification technique to the minimum feature set.

In some implementations, the management platform may use a logistic regression classification technique to determine a categorical outcome (e.g., allocations of tasks to the workers). Additionally, or alternatively, the management platform may use a naïve Bayesian classifier technique. In this case, the management platform may perform binary recursive partitioning to split the historical productivity data and the skills data into partitions and/or branches and use the partitions and/or branches to perform predictions (e.g., allocations of tasks to the workers). Based on using recursive partitioning, the management platform may reduce utilization of computing resources relative to linear sorting and analysis of data points, thereby enabling use of thousands, millions, or billions of data points to train the machine learning model, which may result in a more accurate model than using fewer data points.

Additionally, or alternatively, the management platform may use a support vector machine (SVM) classifier technique to generate a non-linear boundary between data points in the training set. In this case, the non-linear boundary is used to classify test data into a particular class.

Additionally, or alternatively, the management platform may train the machine learning model using a supervised training procedure that includes receiving input to the machine learning model from a subject matter expert, which may reduce an amount of time, an amount of processing resources, and/or the like to train the machine learning model of activity automatability, relative to an unsupervised training procedure. In some implementations, the management platform may use one or more other model training techniques, such as a neural network technique, a latent semantic indexing technique, and/or the like. For example, the management platform may perform an artificial neural network processing technique (e.g., using a two-layer feed-forward neural network architecture, a three-layer feedforward neural network architecture, and/or the like) to perform pattern recognition with regard to particular insights indicated in the historical productivity data and the skills data. In this case, using the artificial neural network processing technique may improve an accuracy of the trained machine learning model generated by the management platform by being more robust to noisy, imprecise, or incomplete data, and by enabling the management platform to detect patterns and/or trends undetectable to systems using fewer and/or less complex techniques.

In some implementations, the management platform may receive the trained machine learning model from another source and may retrain the machine learning model as described below.

Figure 1D:
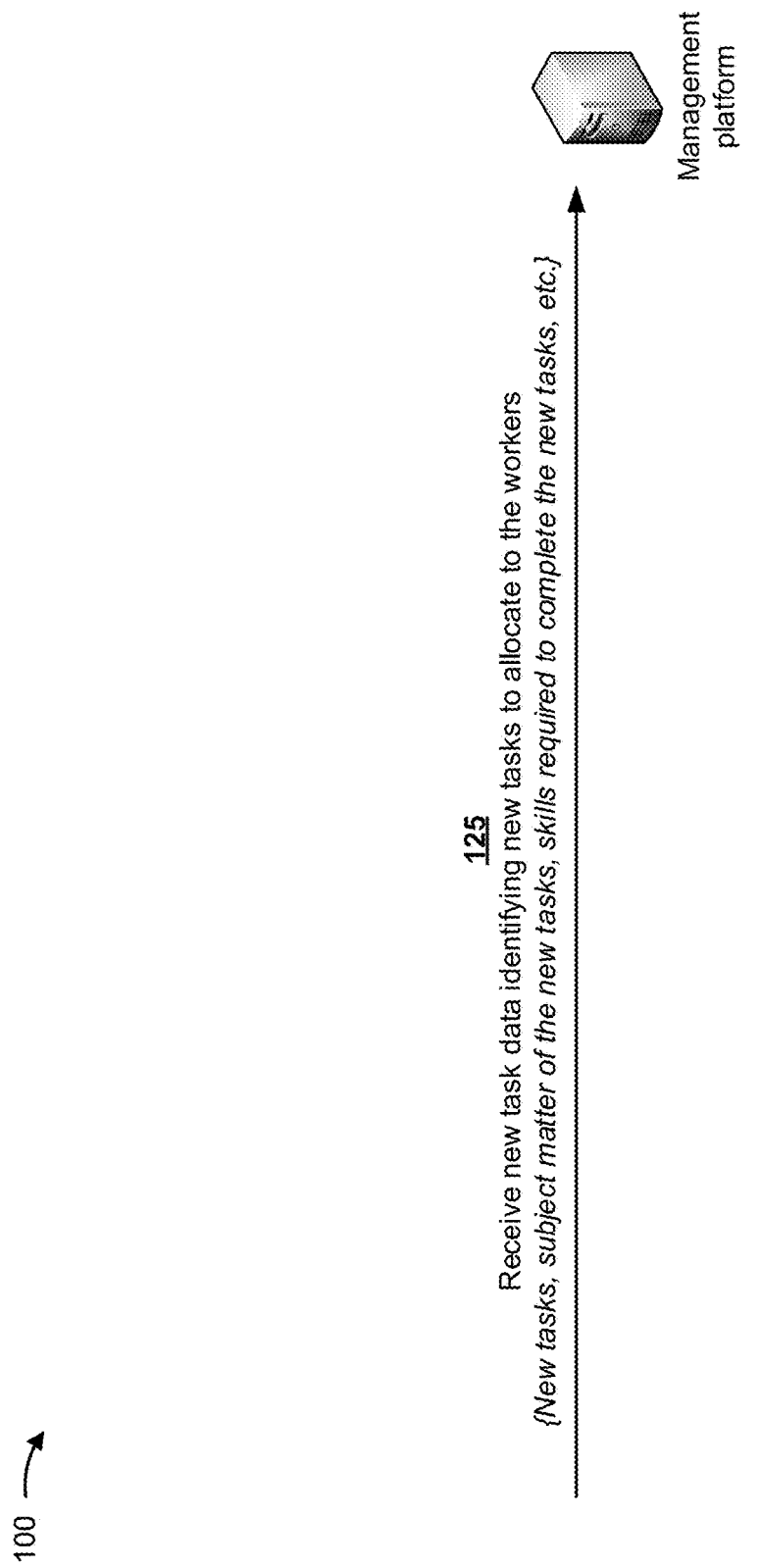

As shown in FIG. 1D, and by reference number 125, the management platform may receive new task data identifying new tasks to allocate to the workers. In some implementations, the management platform may receive the new task data from the client devices, from a client device associated with a manager of the workers, from a data structure (e.g., a database, a table, a list, and/or the like) associated with the management platform, from a server device associated with the management platform, and/or the like. In some implementations, the new task data may include thousands, millions, billions, etc., of data points identifying new tasks to allocate to the workers, subject matter of the new tasks, skills required to complete the new tasks, a quantity of experience to complete the new tasks, time periods to complete the new tasks, and/or the like.

Figure 1E:
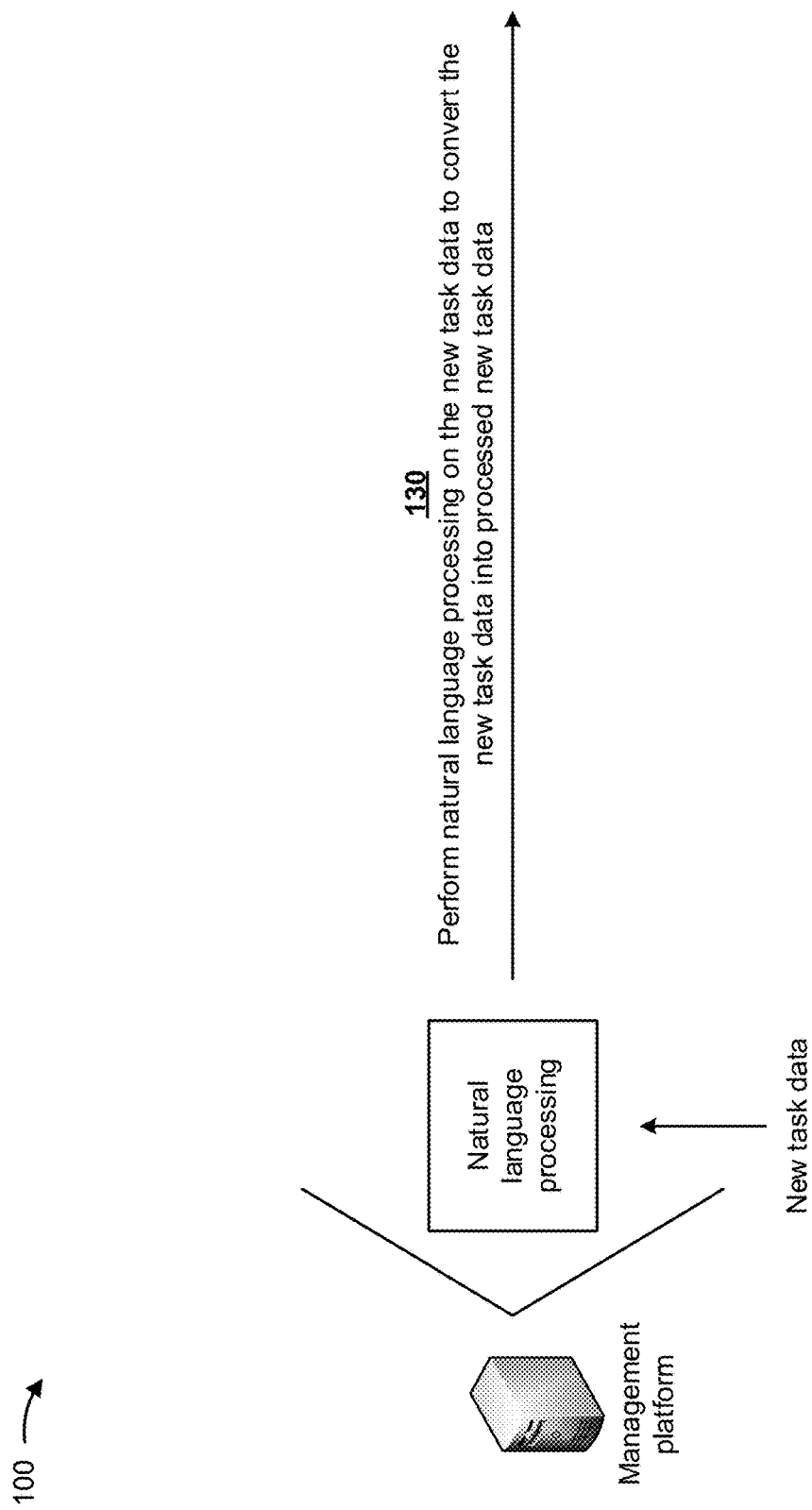

As shown in FIG. 1E, and by reference number 130, the management platform may perform natural language processing on the new task data to convert the new task data into processed new task data. The processed new task data may include the new task data provided in a format (e.g., an electronic or machine-encoded format) that is understood by the trained machine learning model. In some implementations, the management platform may utilize optical character recognition, speech recognition, a natural language processing technique, a computational linguistics technique, a text analysis technique, and/or the like, in order to process the new task data and generate the processed new task data.

The management platform may utilize optical character recognition (OCR) with the new task data in order to convert the new task data into electronic data. Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

The management platform may utilize speech recognition with the new task data in order to convert audio-based data into text-based data. Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences.

The management platform may utilize a natural language processing technique, a computational linguistics technique, a text analysis technique, and/or the like, with the new task data in order to make the new task data analyzable (e.g., the processed new task data). For example, the management platform may apply natural language processing to interpret the new task data and generate additional information associated with the potential meaning of information within the new task data. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

The management platform may utilize optical character recognition, speech recognition, a natural language processing technique, a computational linguistics technique, a text analysis technique, and/or the like, in order to process the real-time productivity data, the historical productivity data, and/or the skills data in a similar manner.

Figure 1F:
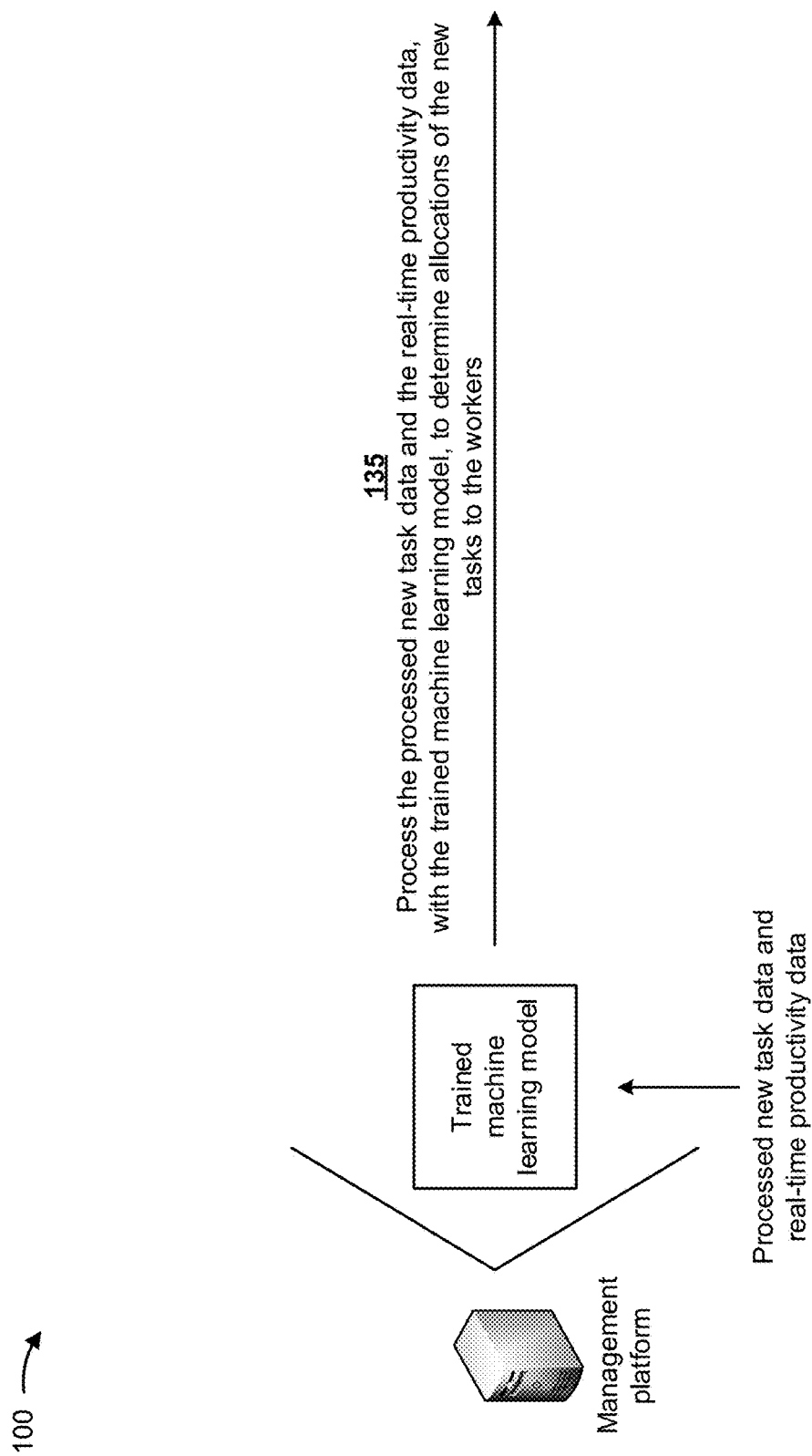

As shown in FIG. 1F, and by reference number 135, the management platform may process the processed new task data and the real-time productivity data, with the trained machine learning model, to determine allocations of the new tasks to the workers. The determined allocations of the new tasks to the workers may include data identifying which of the new tasks are to be allocated to which of the workers (e.g., to client devices associated with the workers), the subject matter of the new tasks, time periods to complete the new tasks, and/or the like.

Figure 1G:
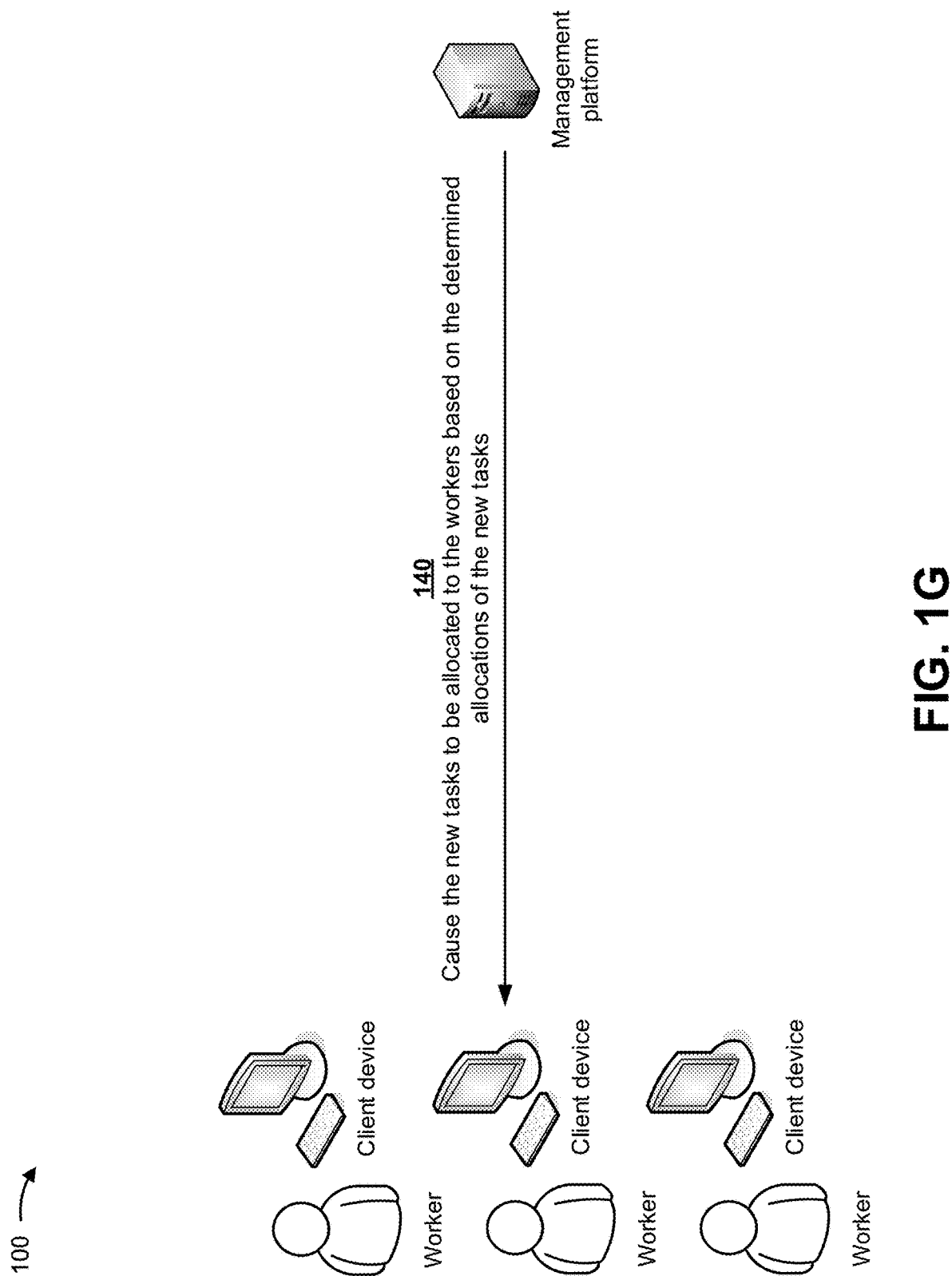

As shown in FIG. 1G, and by reference number 140, the management platform may cause the new tasks to be allocated to the workers based on the determined allocations of the new tasks. In some implementations, the management platform may provide data identifying the new tasks to client devices associated with the workers based on the determined allocations of the new tasks. In some implementations, the management platform may cause one or more devices (e.g., one or more server devices associated with the client devices) to provide the data identifying the new tasks to the client devices associated with the workers based on the determined allocations of the new tasks.

The client devices may receive the data identifying the new tasks and may present the data identifying the new tasks to the workers. The workers may utilize the data identifying the new tasks to perform actions necessary to complete the new tasks. For example, if the new tasks relate to answering customer calls, the workers may begin answering the customer calls based on the new tasks.

As shown in FIG. 1H, and by reference number 145, the management platform may perform one or more actions based on the determined allocations of the new tasks. In some implementations, the one or more actions may include the management platform causing virtual machines to be instantiated for performance of the new tasks. For example, if the new tasks require the workers to utilize a particular software application, the management platform may instantiate virtual machines that provide the particular software application. In this way, the management platform automatically instantiates virtual machines on an as-needed basis (e.g., for the performance of the new tasks) and may remove the virtual machines once the new tasks are completed, which conserves computing resources, networking resources, and/or the like.

In some implementations, the one or more actions may include the management platform causing an automated device to deliver an object to one of the workers for performance of one of the new tasks. For example, if a worker requires a particular tool to perform a new task, the management platform may dispatch a drone or a robot to provide the particular tool to the worker. In this way, the management platform enables the workers to have objects necessary for completion of the new tasks, which prevents the workers from being idle and wasting time waiting to perform the new tasks.

In some implementations, the one or more actions may include the management platform causing one or more devices to reallocate other tasks assigned to one of the workers. For example, if a worker is performing other tasks (e.g., of lesser priority than new tasks) that will prevent completion of the new tasks assigned to the worker, the management platform may reallocate the other tasks. In this way, the management platform enables the worker to complete higher priority tasks, which conserves computing resources, networking resources, and/or the like that would otherwise be wasted completing lesser priority tasks.

In some implementations, the one or more actions may include the management platform causing the client devices to be updated with software for performing the new tasks. For example, if the new tasks require the workers to utilize a particular software application, the management platform may install the particular software application on the client devices. In this way, the management platform automatically installs software on an as-needed basis (e.g., for the performance of the new tasks).

In some implementations, the one or more actions may include the management platform causing the client devices to be updated with hardware for performing the new tasks. For example, if the new tasks require the workers to utilize a particular computer hardware (e.g., a storage device), the management platform may cause the particular computer hardware to be installed on the client devices. In this way, the management platform automatically installs hardware on an as-needed basis (e.g., for the performance of the new tasks).

In some implementations, the one or more actions may include the management platform providing, to a client device associated with a manager of the workers, information suggesting an allocation of a new task to a worker. The manager may utilize the client device to approve or reject the suggested allocation and the client device may provide information indicating the approval or the rejection to the management platform. In some implementations, the management platform may determine the allocation of the new task based on the information indicating the approval or the rejection. In this way, the management platform may receive information from the manager that may be used to retrain the machine learning model.

In some implementations, the one or more actions may include the management platform retraining the machine learning model based on a response (e.g., indicating the approval or the rejection of the suggested allocation) to the information suggesting the allocation of the new task. For example, the management platform may retrain the machine learning model based on the response, as described above in connection with FIG. 1C. In this way, the management platform improves the predictive capabilities of the machine learning model.

In some implementations, the one or more actions may include the management platform retraining the machine learning model based on the determined allocations of the new tasks. For example, the management platform may retrain the machine learning model based on the determined allocations of the new tasks, as described above in connection with FIG. 1C. In this way, the management platform improves the predictive capabilities of the machine learning model.

In some implementations, the one or more actions may include the management platform receiving, from the client devices, new real-time productivity data identifying productivity of the workers in completing the new tasks allocated to the workers; determining that one or more of the new tasks are to be reallocated based on the new real-time productivity data; and causing one or more devices to reallocate the one or more of the new tasks based on determining that the one or more of the new tasks are to be reallocated. In this way, the management platform may cause the new tasks to be completed more efficiently, which conserves computing resources, networking resources, and/or the like.

In some implementations, the one or more actions may include the management platform providing, to a client device associated with a manager of the workers, information suggesting the determined allocations of the new tasks, prior to causing the new tasks to be allocated to the workers based on the determined allocations of the new tasks; receiving, from the client device, a response indicating an approval of the information suggesting the determined allocations of the new tasks; and causing the new tasks to be allocated to the workers by the one or more devices and based on the response. In this way, the management platform may seek input from the manager prior to allocating the new tasks.

In some implementations, the one or more actions may include the management platform receiving new real-time productivity data identifying productivity of the workers in completing the new tasks allocated to the workers; determining that one or more of the new tasks are to be reallocated based on the new real-time productivity data; and retraining the machine learning model based on determining that the one or more of the new tasks are to be reallocated. In this way, the management platform improves the predictive capabilities of the machine learning model.

In some implementations, the one or more actions may include the management platform providing, to a client device associated with a manager of the workers, information suggesting the determined allocations of the new tasks, prior to causing the new tasks to be allocated to the workers based on the determined allocations of the new tasks; receiving, from the client device, a response indicating an approval of a first portion of the determined allocations of the new tasks and a disapproval of a second portion of the determined allocation; and causing the new tasks, associated with the first portion of the determined allocations, to be allocated to the workers by the one or more devices and based on the response.

In some implementations, the one or more actions may include the management platform comparing the real-time productivity data and the new real-time productivity data; identifying a difference between the real-time productivity data and the new real-time productivity data based on comparing the real-time productivity data and the new real-time productivity data, wherein the difference between the real-time productivity data and the new real-time productivity data is associated with determining that one or more of the new tasks are to be reallocated; and providing, to a client device associated with a manager of the workers, information identifying the difference between the real-time productivity data and the new real-time productivity data.

In some implementations, the one or more actions may include the management platform receiving, from a client device associated with a manager of the workers, an input indicating preferred workers to assign to the new tasks, priorities associated with the new tasks, and/or the like; and processing the processed new task data, the real-time productivity data, and the input, with the trained machine learning model, to determine the allocations of the new tasks to the workers.

Figure 1I:
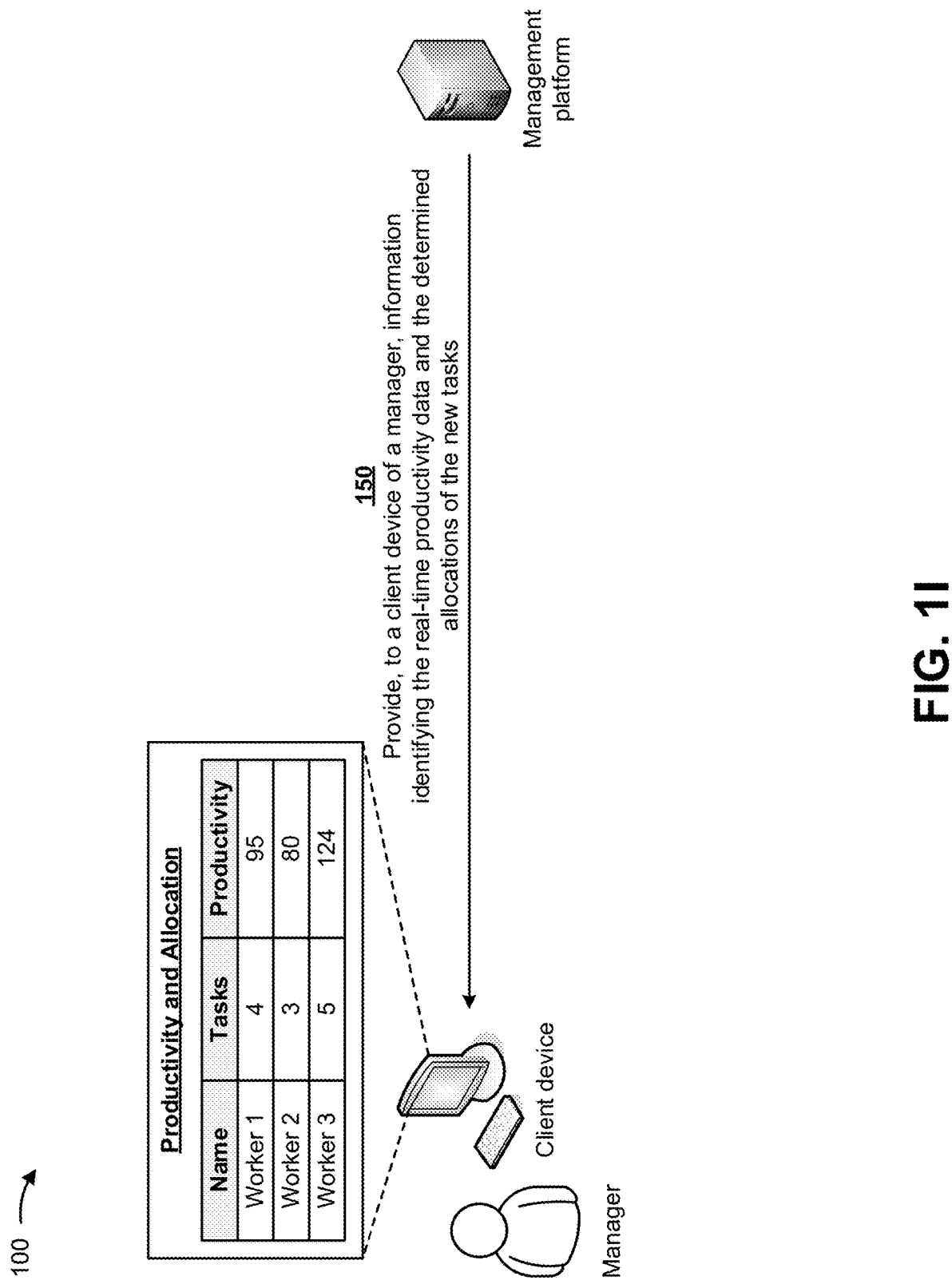

As shown in FIG. 1I, and by reference number 150, the management platform may provide, to a client device associated with a manager of the workers, information identifying the real-time productivity data and the determined allocation of the new tasks. In some implementations, the information identifying the real-time productivity data and the determined allocation of the new tasks may include information identifying names of the workers, new tasks assigned to each of the workers, productivity associated with each of the workers, and/or the like. As further shown in FIG. 1H, the client device may display the information identifying the real-time productivity data and the determined allocation of the new tasks to the manager via a user interface.

In this way, several different stages of a process for managing and allocating tasks are automated utilizing a machine learning model and natural language processing, which may improve speed and efficiency of the process and conserve computing resources (e.g., processing resources, memory resources, and/or the like), networking resources, and/or the like. Furthermore, implementations described herein use a rigorous, computerized process to perform tasks that were not previously performed. For example, currently there does not exist a technique that utilizes a machine learning model and natural language processing to manage and allocate tasks. Utilizing a machine learning model and natural language processing to manage and allocate tasks conserves computing resources (e.g., processing resources, memory resources, and/or the like), networking resources, and/or the like that would otherwise be wasted in attempting to manage and allocate tasks. Finally, utilizing a machine learning model and natural language processing to manage and allocate tasks solves the big data problem associated with managing thousands, millions, billions, etc., of data points identifying skillsets of workers, languages spoken by workers, working hours of workers, locations of workers, projects worked on by the workers in the past, ratings indicating performance of workers on projects, which workers have worked together before and ratings for those workers on projects, personality type information of workers, and/or the like.

As indicated above, FIGS. 1A-1I are provided merely as examples. Other examples may differ from what is described with regard to FIGS. 1A-1I.

Figure 2:
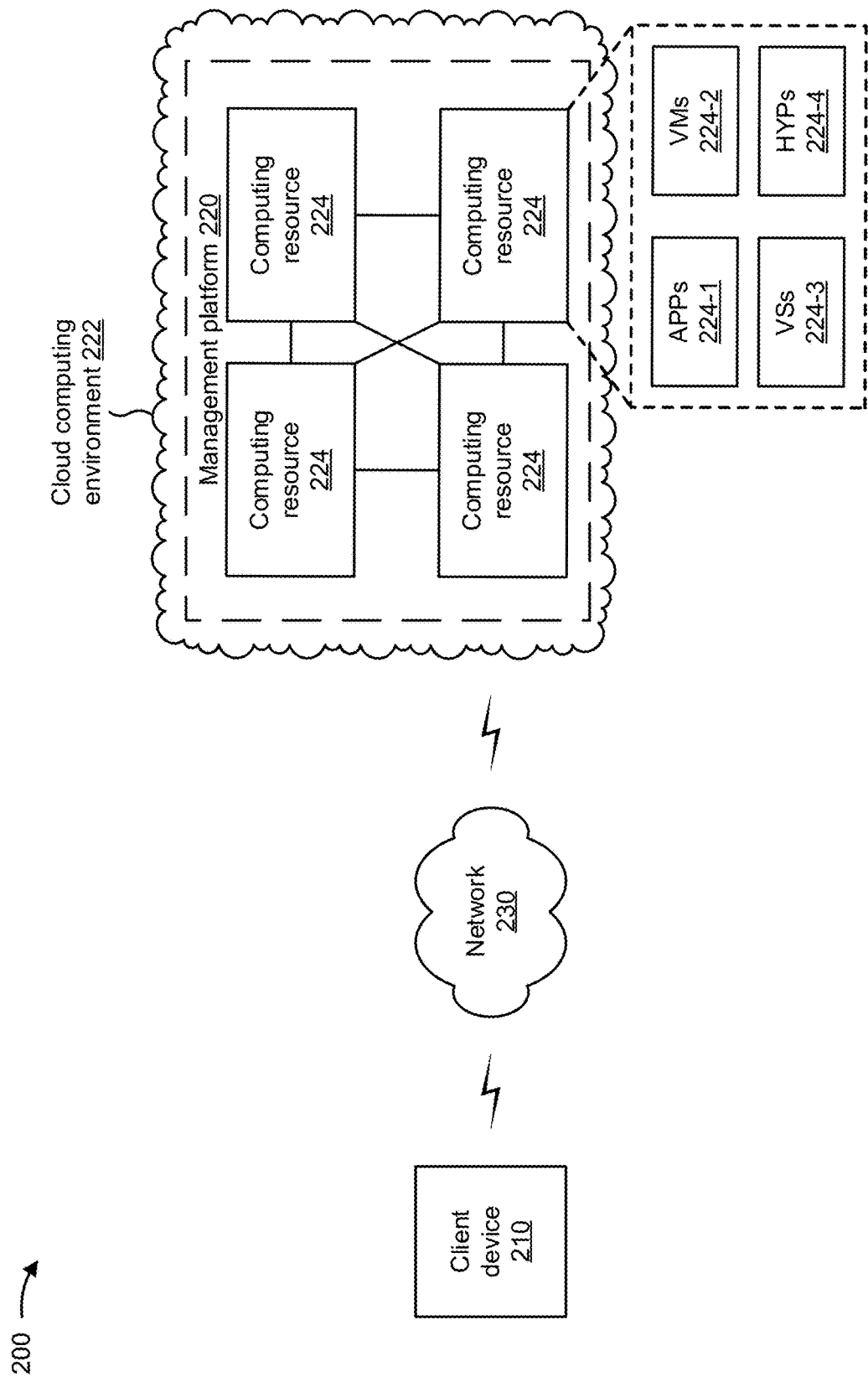
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a management platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to management platform 220.

Management platform 220 includes one or more devices that utilize a machine learning model and natural language processing to manage and allocate tasks. In some implementations, management platform 220 may be designed to be modular such that certain software components may be swapped in or out depending on a particular need. As such, management platform 220 may be easily and/or quickly reconfigured for different uses. In some implementations, management platform 220 may receive information from and/or transmit information to one or more client devices 210.

In some implementations, as shown, management platform 220 may be hosted in a cloud computing environment 222. Notably, while implementations described herein describe management platform 220 as being hosted in cloud computing environment 222, in some implementations, management platform 220 may not be cloud-based (i.e., may be implemented outside of a cloud computing environment) or may be partially cloud-based.

Cloud computing environment 222 includes an environment that hosts management platform 220. Cloud computing environment 222 may provide computation, software, data access, storage, etc., services that do not require end-user knowledge of a physical location and configuration of system(s) and/or device(s) that hosts management platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host management platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with management platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of management platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
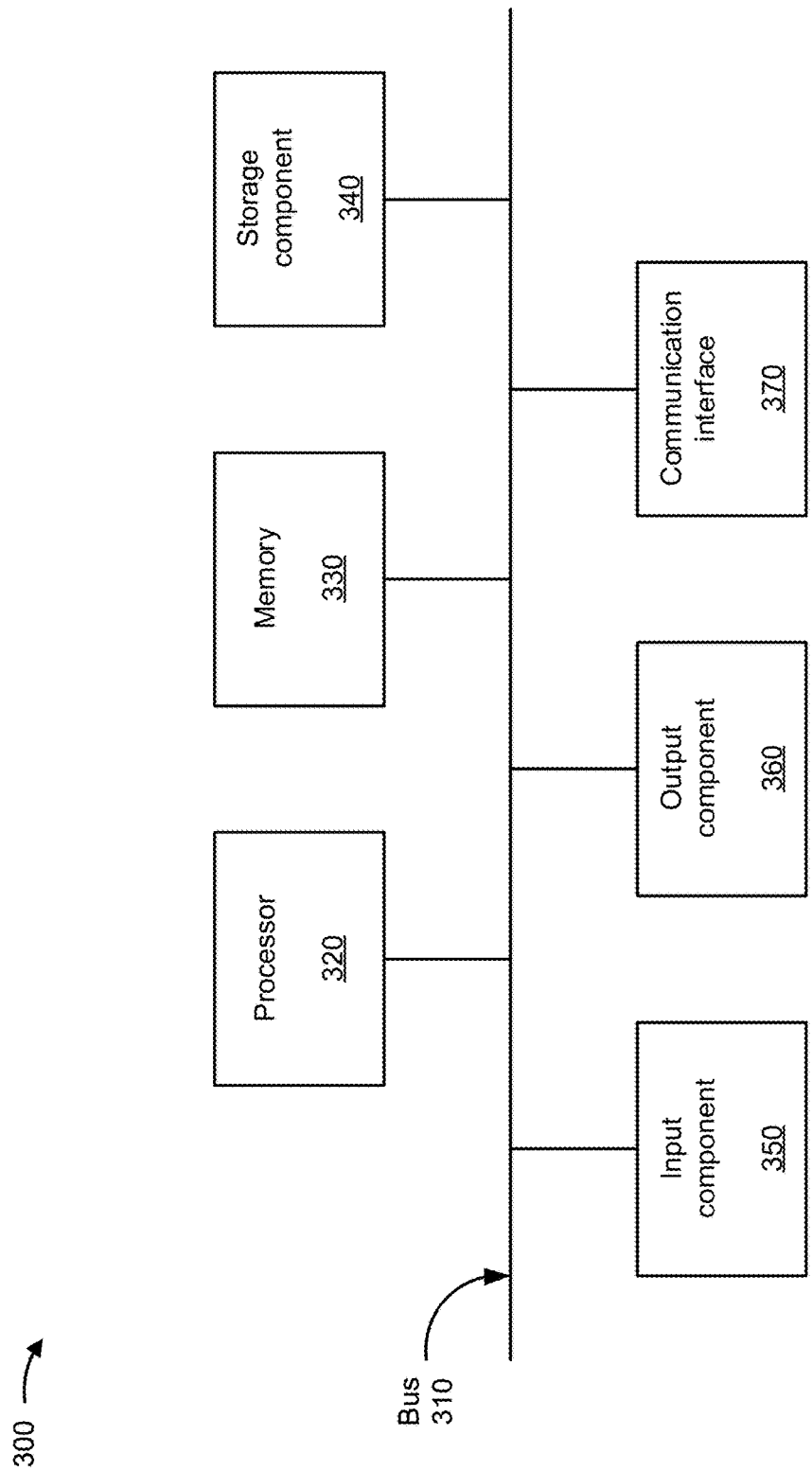
FIG. 3 is a diagram of example components of one or more devices of FIG. 2.

FIG. 3 is a diagram of example components of a device 300. Device 300 may correspond to client device 210, management platform 220, and/or computing resource 224. In some implementations, client device 210, management platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
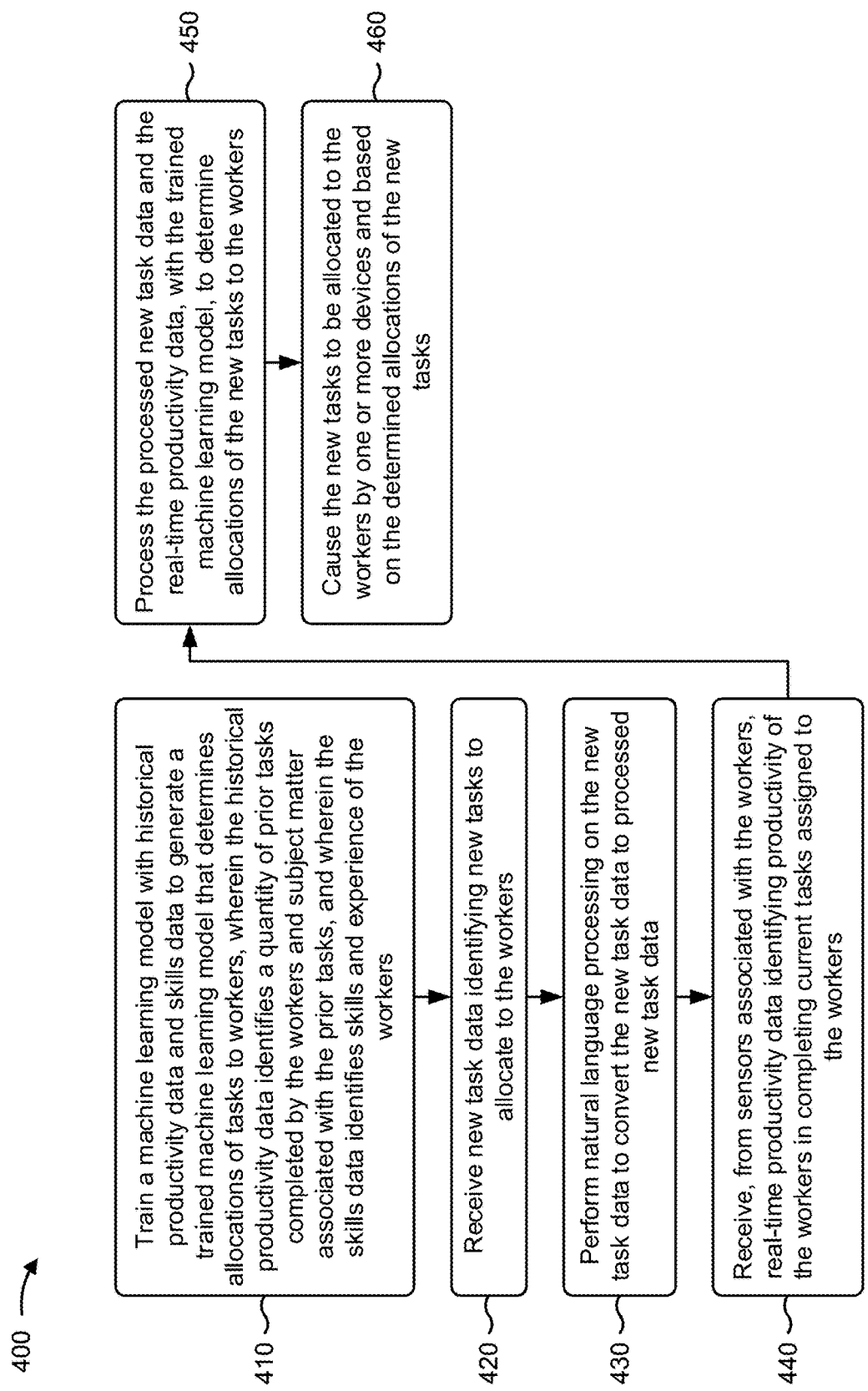

FIG. 4 is a flow chart of an example process 400 for utilizing a machine learning model and natural language processing to manage and allocate tasks. In some implementations, one or more process blocks of FIG. 4 may be performed by a management platform (e.g., management platform 220). In some implementations, one or more process blocks of FIG. 4 may be performed by another device or a group of devices separate from or including the management platform, such as a client device (e.g., client device 210).

As shown in FIG. 4, process 400 may include training a machine learning model with historical productivity data and skills data to generate a trained machine learning model that determines allocations of tasks to workers, wherein the historical productivity data identifies a quantity of prior tasks completed by the workers and subject matter associated with the prior tasks and wherein the skills data identifies skills and experience of the workers (block 410). For example, the management platform (e.g., using computing resource 224, processor 320, storage component 340, and/or the like) may train a machine learning model with historical productivity data and skills data to generate a trained machine learning model that determines allocations of tasks to workers, as described above in connection with FIGS. 1A-2. The historical productivity data may identify a quantity of prior tasks completed by the workers and subject matter associated with the prior tasks and the skills data may identify skills and experience of the workers.

As further shown in FIG. 4, process 400 may include receiving new task data identifying new tasks to allocate to the workers (block 420). For example, the management platform (e.g., using computing resource 224, processor 320, communication interface 370, and/or the like) may receive new task data identifying new tasks to allocate to the workers, as described above in connection with FIGS. 1A-2.

As further shown in FIG. 4, process 400 may include performing natural language processing on the new task data to convert the new task data to processed new task data (block 430). For example, the management platform (e.g., using computing resource 224, processor 320, memory 330, and/or the like) may perform natural language processing on the new task data to convert the new task data to processed new task data, as described above in connection with FIGS. 1A-2.

As further shown in FIG. 4, process 400 may include receiving, from sensors associated with the workers, real-time productivity data identifying productivity of the workers in completing current tasks assigned to the workers (block 440). For example, the management platform (e.g., using computing resource 224, processor 320, communication interface 370, and/or the like) may receive, from sensors associated with the workers, real-time productivity data identifying productivity of the workers in completing current tasks assigned to the workers, as described above in connection with FIGS. 1A-2.

As further shown in FIG. 4, process 400 may include processing the processed new task data and the real-time productivity data, with the trained machine learning model, to determine allocations of the new tasks to the workers (block 450). For example, the management platform (e.g., using computing resource 224, processor 320, storage component 340, and/or the like) may process the processed new task data and the real-time productivity data, with the trained machine learning model, to determine allocations of the new tasks to the workers, as described above in connection with FIGS. 1A-2.

As further shown in FIG. 4, process 400 may include causing the new tasks to be allocated to the workers by one or more devices and based on the determined allocations of the new tasks (block 460). For example, the management platform (e.g., using computing resource 224, processor 320, storage component 340, communication interface 370, and/or the like) may cause the new tasks to be allocated to the workers by one or more devices and based on the determined allocations of the new tasks, as described above in connection with FIGS. 1A-2.

Process 400 may include additional implementations, such as any single implementation or any combination of implementations described below and/or in connection with one or more other processes described elsewhere herein.

In some implementations, the management platform may perform one or more actions based on the determined allocations of the new tasks. When performing the one or more actions, the management platform may cause new virtual machines to be instantiated for the new tasks, may cause an automated device to deliver an object to one of the workers for one of the new tasks, may cause the one or more devices to reallocate other tasks assigned to one of the workers, may cause client devices associated with the workers to be updated with software for performing the new tasks, and/or may retrain the machine learning model based on the determined allocations of the new tasks.

In some implementations, the management platform may receive new real-time productivity data identifying productivity of the workers in completing the new tasks allocated to the workers, may determine that one or more of the new tasks are to be reallocated based on the new real-time productivity data, and may cause the one or more devices to reallocate the one or more of the new tasks based on determining that the one or more of the new tasks are to be reallocated.

In some implementations, the management platform may provide, to a client device associated with a manager of the workers, information suggesting the determined allocations of the new tasks, prior to causing the new tasks to be allocated to the workers based on the determined allocations of the new tasks; may receive, from the client device, a response indicating an approval of the information suggesting the determined allocations of the new tasks; may cause the new tasks to be allocated to the workers by the one or more devices and based on the response; and may retrain the machine learning model based on the response.

In some implementations, the management platform may receive new real-time productivity data identifying productivity of the workers in completing the new tasks allocated to the workers, may determine that one or more of the new tasks are to be reallocated based on the new real-time productivity data, and may retrain the machine learning model based on determining that the one or more of the new tasks are to be reallocated.

In some implementations, the management platform may provide, to a client device associated with a manager of the workers, information suggesting the determined allocations of the new tasks, prior to causing the new tasks to be allocated to the workers based on the determined allocations of the new tasks; may receive, from the client device, a response indicating an approval of a first portion of the determined allocations of the new tasks and a disapproval of a second portion of the determined allocation; may cause the new tasks, associated with the first portion of the determined allocations, to be allocated to the workers by the one or more devices and based on the response; and may retrain the machine learning model based on the response.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing a machine learning model and natural language processing to manage and allocate tasks. In some implementations, one or more process blocks of FIG. 5 may be performed by a management platform (e.g., management platform 220). In some implementations, one or more process blocks of FIG. 5 may be performed by another device or a group of devices separate from or including the management platform, such as a client device (e.g., client device 210).

As shown in FIG. 5, process 500 may include receiving a machine learning model that is trained with historical productivity data and skills data to generate a trained machine learning model that determines allocations of tasks to workers, wherein the historical productivity data identifies a quantity of prior tasks completed by the workers and subject matter associated with the prior tasks and wherein the skills data identifies skills and experience of the workers (block 510). For example, the management platform (e.g., using computing resource 224, processor 320, storage component 340, communication interface 370, and/or the like) may receive a machine learning model that is trained with historical productivity data and skills data to generate a trained machine learning model that determines allocations of tasks to workers, as described above in connection with FIGS. 1A-2. The historical productivity data may identify a quantity of prior tasks completed by the workers and subject matter associated with the prior tasks, and the skills data may identify skills and experience of the workers.

As further shown in FIG. 5, process 500 may include receiving new task data identifying new tasks to allocate to the workers (block 520). For example, the management platform (e.g., using computing resource 224, processor 320, communication interface 370, and/or the like) may receive new task data identifying new tasks to allocate to the workers, as described above in connection with FIGS. 1A-2.

As further shown in FIG. 5, process 500 may include receiving, from sensors associated with the workers, real-time productivity data identifying productivity of the workers in completing current tasks assigned to the workers (block 530). For example, the management platform (e.g., using computing resource 224, processor 320, communication interface 370, and/or the like) may receive, from sensors associated with the workers, real-time productivity data identifying productivity of the workers in completing current tasks assigned to the workers, as described above in connection with FIGS. 1A-2.

As further shown in FIG. 5, process 500 may include processing the new task data and the real-time productivity data, with the trained machine learning model, to determine allocations of the new tasks to the workers (block 540). For example, the management platform (e.g., using computing resource 224, processor 320, storage component 340, and/or the like) may process the new task data and the real-time productivity data, with the trained machine learning model, to determine allocations of the new tasks to the workers, as described above in connection with FIGS. 1A-2.

As further shown in FIG. 5, process 500 may include causing one or more devices to allocate the new tasks to the workers based on the determined allocations of the new tasks (block 550). For example, the management platform (e.g., using computing resource 224, processor 320, memory 330, communication interface 370, and/or the like) may cause one or more devices to allocate the new tasks to the workers based on the determined allocations of the new tasks, as described above in connection with FIGS. 1A-2.

As further shown in FIG. 5, process 500 may include receiving, from the sensors, new real-time productivity data identifying productivity of the workers in completing the new tasks allocated to the workers (block 560). For example, the management platform (e.g., using computing resource 224, processor 320, communication interface 370, and/or the like) may receive, from the sensors, new real-time productivity data identifying productivity of the workers in completing the new tasks allocated to the workers, as described above in connection with FIGS. 1A-2.

As further shown in FIG. 5, process 500 may include determining that one or more of the new tasks are to be reallocated based on the new real-time productivity data (block 570). For example, the management platform (e.g., using computing resource 224, processor 320, storage component 340, and/or the like) may determine that one or more of the new tasks are to be reallocated based on the new real-time productivity data, as described above in connection with FIGS. 1A-2.

As further shown in FIG. 5, process 500 may include causing the one or more devices to reallocate the one or more of the new tasks based on determining that the one or more of the new tasks are to be reallocated (block 580). For example, the management platform (e.g., using computing resource 224, processor 320, communication interface 370, and/or the like) may cause the one or more devices to reallocate the one or more of the new tasks based on determining that the one or more of the new tasks are to be reallocated, as described above in connection with FIGS. 1A-2.

Process 500 may include additional implementations, such as any single implementation or any combination of implementations described below and/or in connection with one or more other processes described elsewhere herein.

In some implementations, the management platform may retrain the machine learning model based on determining that the one or more of the new tasks are to be reallocated.

In some implementations, the management platform may compare the real-time productivity data and the new real-time productivity data, and may identify a difference between the real-time productivity data and the new real-time productivity data based on comparing the real-time productivity data and the new real-time productivity data. The difference between the real-time productivity data and the new real-time productivity data may be associated with determining that one or more of the new tasks are to be reallocated. The management platform may provide, to a client device associated with a manager of the workers, information identifying the difference between the real-time productivity data and the new real-time productivity data.

In some implementations, the management platform may receive, from a client device associated with a manager of the workers, an input indicating priorities associated with the new tasks, and may process the new task data, the real-time productivity data, and the input, with the trained machine learning model, to determine the allocations of the new tasks to the workers. In some implementations, the management platform may perform natural language processing on the new task data to convert the new task data to a format for processing by the trained machine learning model. In some implementations, the management platform may retrain the machine learning model based on determining that the one or more of the new tasks are to be reallocated.

In some implementations, the management platform may provide, to a client device associated with a manager of the workers, information suggesting a determined allocation of an additional new task; may receive, from the client device, a response indicating a disapproval of the determined allocation of the additional new task; and may retrain the machine learning model based on the response.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing a machine learning model and natural language processing to manage and allocate tasks. In some implementations, one or more process blocks of FIG. 6 may be performed by a management platform (e.g., management platform 220). In some implementations, one or more process blocks of FIG. 6 may be performed by another device or a group of devices separate from or including the management platform, such as a client device (e.g., client device 210).

As shown in FIG. 6, process 600 may include receiving new task data identifying new tasks to allocate to workers (block 610). For example, the management platform (e.g., using computing resource 224, processor 320, communication interface 370, and/or the like) may receive new task data identifying new tasks to allocate to workers, as described above in connection with FIGS. 1A-2.

As further shown in FIG. 6, process 600 may include performing natural language processing on the new task data to convert the new task data to processed new task data (block 620). For example, the management platform (e.g., using computing resource 224, processor 320, memory 330, and/or the like) may perform natural language processing on the new task data to convert the new task data to processed new task data, as described above in connection with FIGS. 1A-2.

As further shown in FIG. 6, process 600 may include receiving, from sensors associated with the workers, real-time productivity data identifying productivity of the workers in completing current tasks assigned to the workers (block 630). For example, the management platform (e.g., using computing resource 224, processor 320, communication interface 370, and/or the like) may receive, from sensors associated with the workers, real-time productivity data identifying productivity of the workers in completing current tasks assigned to the workers, as described above in connection with FIGS. 1A-2.

As further shown in FIG. 6, process 600 may include processing the processed new task data and the real-time productivity data, with a trained machine learning model, to determine allocations of the new tasks to the workers, wherein a machine learning model is trained with historical productivity data and skills data to generate the trained machine learning model, wherein the historical productivity data identifies a quantity of prior tasks completed by the workers and subject matter associated with the prior tasks, and wherein the skills data identifies skills and experience of the workers (block 640). For example, the management platform (e.g., using computing resource 224, processor 320, storage component 340, and/or the like) may process the processed new task data and the real-time productivity data, with a trained machine learning model, to determine allocations of the new tasks to the workers, as described above in connection with FIGS. 1A-2. A machine learning model may be trained with historical productivity data and skills data to generate the trained machine learning model. The historical productivity data may identify a quantity of prior tasks completed by the workers and subject matter associated with the prior tasks, and the skills data may identify skills and experience of the workers.

As further shown in FIG. 6, process 600 may include causing one or more devices to allocate the new tasks to the workers based on the determined allocations of the new tasks (block 650). For example, the management platform (e.g., using computing resource 224, processor 320, memory 330, communication interface 370, and/or the like) may cause one or more devices to allocate the new tasks to the workers based on the determined allocations of the new tasks, as described above in connection with FIGS. 1A-2.

As further shown in FIG. 6, process 600 may include receiving, from the sensors, new real-time productivity data identifying productivity of the workers in completing the new tasks allocated to the workers (block 660). For example, the management platform (e.g., using computing resource 224, processor 320, communication interface 370, and/or the like) may receive, from the sensors, new real-time productivity data identifying productivity of the workers in completing the new tasks allocated to the workers, as described above in connection with FIGS. 1A-2.

As further shown in FIG. 6, process 600 may include determining that one or more of the new tasks are to be reallocated based on the new real-time productivity data (block 670). For example, the management platform (e.g., using computing resource 224, processor 320, storage component 340, communication interface 370, and/or the like) may determine that one or more of the new tasks are to be reallocated based on the new real-time productivity data, as described above in connection with FIGS. 1A-2.

As further shown in FIG. 6, process 600 may include causing the one or more devices to reallocate the one or more of the new tasks based on determining that the one or more of the new tasks are to be reallocated (block 680). For example, the management platform (e.g., using computing resource 224, processor 320, communication interface 370, and/or the like) may cause the one or more devices to reallocate the one or more of the new tasks based on determining that the one or more of the new tasks are to be reallocated, as described above in connection with FIGS. 1A-2.

Process 600 may include additional implementations, such as any single implementation or any combination of implementations described below and/or in connection with one or more other processes described elsewhere herein.

In some implementations, the instructions further comprise. In some implementations, the management platform may cause new virtual machines to be instantiated for the new tasks, may cause an automated device to deliver an object to one of the workers for one of the new tasks, may cause the one or more devices to reallocate other tasks assigned to one of the workers, may cause client devices associated with the workers to be updated with software for performing the new tasks, and/or may retrain the machine learning model based on the determined allocations of the new tasks.

In some implementations, the management platform may retrain the machine learning model based on determining that the one or more of the new tasks are to be reallocated. In some implementations, the management platform may compare the real-time productivity data and the new real-time productivity data, and may identify a difference between the real-time productivity data and the new real-time productivity data based on comparing the real-time productivity data and the new real-time productivity data. The difference between the real-time productivity data and the new real-time productivity data may be associated with determining that one or more of the new tasks are to be reallocated. The management platform may provide, to a client device associated with a manager of the workers, information identifying the difference between the real-time productivity data and the new real-time productivity data.

In some implementations, the management platform may receive, from a client device associated with a manager of the workers, an input indicating preferred workers to assign to the new tasks, and may process the processed new task data, the real-time productivity data, and the input, with the trained machine learning model, to determine the allocations of the new tasks to the workers.

In some implementations, the management platform may provide, to a client device associated with a manager of the workers, information suggesting the determined allocations of the new tasks, prior to causing the one or more devices to allocate the new tasks to the workers; may receive, from the client device, a response indicating an approval of a first portion of the determined allocations of the new tasks and a disapproval of a second portion of the determined allocation; may cause the one or more devices to allocate the new tasks, associated with the first portion of the determined allocations, to the workers based on the response; and may retrain the machine learning model based on the response.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   training, by a device, a machine learning model with historical productivity data and skills data to generate a trained machine learning model that determines allocations of tasks to workers,
      wherein the historical productivity data identifies a quantity of prior tasks completed by the workers and subject matter associated with the prior tasks, and
      wherein the skills data identifies skills and experience of the workers;
   receiving, by the device, new task data identifying new tasks to allocate to the workers;
   performing, by the device, natural language processing on the new task data to convert the new task data to processed new task data;
   receiving, by the device and from sensors associated with the workers, real-time productivity data identifying productivity of the workers in completing current tasks assigned to the workers,
      wherein the sensors include at least one of:
         one or more biometric sensors,
         one or more video cameras, or
         one or more telephone monitoring devices, and
      wherein the sensors provide data indicating when the workers complete the current tasks;
   processing, by the device, the processed new task data and the real-time productivity data, with the trained machine learning model, to determine allocations of the new tasks to the workers;
   causing, by the device, the new tasks to be allocated to the workers by one or more devices and based on the determined allocations of the new tasks;
   retraining, by the device and using one or more supervised machine learning techniques, the trained machine learning model to generate a new machine learning model based on using the determined allocations of the new tasks as training data and validation data for the supervised machine learning technique;
   performing, by the device, one or more actions based on the determined allocations of the new tasks, the one or more actions comprising:
      causing new virtual machines to be instantiated for the new tasks based on one or more requirements associated with the new tasks; or
      causing an automated device to deliver an object to one of the workers for one of the new tasks; or
      causing client devices associated with the workers to be updated with software for performing the new tasks;
   providing, by the device, the new machine learning model to process additional task data and additional real-time productivity data received from the sensors; and
   removing, by the device, the new virtual machines instantiated for the new tasks when the new tasks are completed.

2. The method of claim 1, further comprising:
   receiving new real-time productivity data identifying productivity of the workers in completing the new tasks allocated to the workers;
   determining that one or more of the new tasks are to be reallocated based on the new real-time productivity data; and
   causing the one or more devices to reallocate the one or more of the new tasks based on determining that the one or more of the new tasks are to be reallocated.

3. The method of claim 1, further comprising:
   providing, to a client device associated with a manager of the workers, information suggesting the determined allocations of the new tasks, prior to causing the new tasks to be allocated to the workers based on the determined allocations of the new tasks;
   receiving, from the client device, a response indicating an approval of the information suggesting the determined allocations of the new tasks; and
   causing the new tasks to be allocated to the workers by the one or more devices and based on the response.

4. The method of claim 1, further comprising:
receiving new real-time productivity data identifying productivity of the workers in completing the new tasks allocated to the workers;
determining that one or more of the new tasks are to be reallocated based on the new real-time productivity data; and
retraining the new machine learning model based on determining that the one or more of the new tasks are to be reallocated.

5. The method of claim 1, further comprising:
providing, to a client device associated with a manager of the workers, information suggesting the determined allocations of the new tasks, prior to causing the new tasks to be allocated to the workers based on the determined allocations of the new tasks;
receiving, from the client device, a response indicating an approval of a first portion of the determined allocations of the new tasks and a disapproval of a second portion of the determined allocation;
causing the new tasks, associated with the first portion of the determined allocations, to be allocated to the workers by the one or more devices and based on the response; and
wherein retraining the trained machine learning model comprises:
retraining the trained machine learning model based on the response.

6. The method of claim 1, wherein performing the natural language processing on the new task data to convert the new task data to the processed new task data comprises:
formatting the processed new task data for processing by the trained machine learning model.

7. The method of claim 1, wherein receiving the real-time productivity data comprises:
receiving the real-time productivity data from a plurality of user devices that the workers use in completing the current tasks, and
wherein the real-time productivity data specifies at least one of:
a quantity of tasks completed, or
a quantity of tasks left to be completed.

8. A device, comprising:
one or more memories; and
one or more processors, communicatively coupled to the one or more memories, to:
receive a machine learning model that is trained with historical productivity data and skills data to generate a trained machine learning model that determines allocations of tasks to workers,
wherein the historical productivity data identifies a quantity of prior tasks completed by the workers and subject matter associated with the prior tasks, and
wherein the skills data identifies skills and experience of the workers;
receive new task data identifying new tasks to allocate to the workers;
receive, from sensors associated with the workers, real-time productivity data identifying productivity of the workers in completing current tasks assigned to the workers,
wherein the sensors include at least one of:
one or more biometric sensors,
one or more video cameras, or
one or more telephone monitoring devices, and
wherein the sensors provide data indicating when the workers complete the current tasks;
process the new task data and the real-time productivity data, with the trained machine learning model, to determine allocations of the new tasks to the workers;
cause one or more devices to allocate the new tasks to the workers based on the determined allocations of the new tasks;
receive, from the sensors, new real-time productivity data identifying productivity of the workers in completing the new tasks allocated to the workers;
determine that one or more of the new tasks are to be reallocated based on the new real-time productivity data;
cause the one or more devices to reallocate the one or more of the new tasks based on determining that the one or more of the new tasks are to be reallocated;
retrain, using one or more supervised machine learning techniques, the trained machine learning model to generate a new machine learning model based on using the determined allocations of the new tasks as training data and validation data for the supervised machine learning technique;
perform one or more actions based on the determining that the one or more of the new tasks are to be reallocated, the one or more actions comprising:
causing new virtual machines to be instantiated for the new tasks based on one or more requirements associated with the new tasks;
causing an automated device to deliver an object to one of the workers for one of the new tasks; or
causing client devices associated with the workers to be updated with software for performing the new tasks;
provide the new machine learning model to process additional task data and additional real-time productivity data received from the sensors; and
remove the new virtual machines instantiated for the new tasks when the new tasks are completed.

9. The device of claim 8, wherein the one or more processors are further to:
compare the real-time productivity data and the new real-time productivity data;
identify a difference between the real-time productivity data and the new real-time productivity data based on comparing the real-time productivity data and the new real-time productivity data,
wherein the difference between the real-time productivity data and the new real-time productivity data is associated with determining that one or more of the new tasks are to be reallocated; and
provide, to a client device associated with a manager of the workers, information identifying the difference between the real-time productivity data and the new real-time productivity data.

10. The device of claim 8, wherein the one or more processors are further to:
receive, from a client device associated with a manager of the workers, an input indicating priorities associated with the new tasks,
wherein the one or more processors, when processing the new task data and the real-time productivity data with the trained machine learning model, are to:

process the new task data, the real-time productivity data, and the input, with the trained machine learning model, to determine the allocations of the new tasks to the workers.

11. The device of claim 8, wherein the one or more processors are further to:
perform natural language processing on the new task data to convert the new task data to a format for processing by the trained machine learning model.

12. The device of claim 8, wherein the one or more processors are further to:
cause, based on the determining that the one or more of the new tasks are to be reallocated, reallocation of other tasks assigned to one of the workers.

13. The device of claim 8, wherein the one or more processors are further to:
provide, to a client device associated with a manager of the workers, information suggesting a determined allocation of an additional new task;
receive, from the client device, a response indicating a disapproval of the determined allocation of the additional new task; and
wherein the one or more processors, when retraining the trained machine learning model, are to:
retrain the trained machine learning model based on the response.

14. The device of claim 8, wherein the one or more processors, when receiving the real-time productivity data, are configured to:
receive the real-time productivity data from a plurality of user devices that the workers use in completing the current tasks, and
wherein the real-time productivity data specifies at least one of:
a quantity of tasks completed, or
a quantity of tasks left to be completed.

15. A non-transitory computer-readable medium storing instructions, the instructions comprising:
one or more instructions that, when executed by one or more processors of a device, cause the one or more processors to:
receive new task data identifying new tasks to allocate to workers;
perform natural language processing on the new task data to convert the new task data to processed new task data;
receive, from sensors associated with the workers, real-time productivity data identifying productivity of the workers in completing current tasks assigned to the workers,
wherein the sensors include at least one of:
one or more biometric sensors,
one or more video cameras, or
one or more telephone monitoring devices, and
wherein the sensors provide data indicating when the workers complete the current tasks;
process the processed new task data and the real-time productivity data, with a trained machine learning model, to determine allocations of the new tasks to the workers,
wherein a machine learning model is trained with historical productivity data and skills data to generate the trained machine learning model,
wherein the historical productivity data identifies a quantity of prior tasks completed by the workers and subject matter associated with the prior tasks, and
wherein the skills data identifies skills and experience of the workers;
cause one or more devices to allocate the new tasks to the workers based on the determined allocations of the new tasks;
receive, from the sensors, new real-time productivity data identifying productivity of the workers in completing the new tasks allocated to the workers;
determine that one or more of the new tasks are to be reallocated based on the new real-time productivity data;
cause the one or more devices to reallocate the one or more of the new tasks based on determining that the one or more of the new tasks are to be reallocated;
retrain, using one or more supervised machine learning techniques, the trained machine learning model to generate a new machine learning model based on using the determined allocations of the new tasks as training data and validation data for the supervised machine learning technique;
perform one or more actions based on the determining that the one or more of the new tasks are to be reallocated, the one or more actions comprising:
causing new virtual machines to be instantiated for the new tasks based on one or more requirements associated with the new tasks;
causing an automated device to deliver an object to one of the workers for one of the new tasks; or
causing client devices associated with the workers to be updated with software for performing the new tasks;
provide the new machine learning model to process additional task data and additional real-time productivity data received from the sensors; and
remove the new virtual machines instantiated for the new tasks when the new tasks are completed.

16. The non-transitory computer-readable medium of claim 15, wherein the instructions further comprise:
one or more instructions that, when executed by the one or more processors, cause the one or more processors to:
compare the real-time productivity data and the new real-time productivity data;
identify a difference between the real-time productivity data and the new real-time productivity data based on comparing the real-time productivity data and the new real-time productivity data,
wherein the difference between the real-time productivity data and the new real-time productivity data is associated with determining that one or more of the new tasks are to be reallocated; and
provide, to a client device associated with a manager of the workers, information identifying the difference between the real-time productivity data and the new real-time productivity data.

17. The non-transitory computer-readable medium of claim 15, wherein the instructions further comprise:
one or more instructions that, when executed by the one or more processors, cause the one or more processors to:
receive, from a client device associated with a manager of the workers, an input indicating preferred workers to assign to the new tasks,
wherein the one or more instructions that cause the one or more processors to process the processed new task data and the real-time productivity data with the trained machine learning model, are to:

process the processed new task data, the real-time productivity data, and the input, with the trained machine learning model, to determine the allocations of the new tasks to the workers.

18. The non-transitory computer-readable medium of claim 15, wherein the instructions further comprise:
one or more instructions that, when executed by the one or more processors, cause the one or more processors to:
provide, to a client device associated with a manager of the workers, information suggesting the determined allocations of the new tasks, prior to causing the one or more devices to allocate the new tasks to the workers;
receive, from the client device, a response indicating an approval of a first portion of the determined allocations of the new tasks and a disapproval of a second portion of the determined allocation;
cause the one or more devices to allocate the new tasks, associated with the first portion of the determined allocations, to the workers based on the response; and
wherein the one or more instructions, that cause the one or more processors to retrain the trained machine learning model, cause the one or more processors to:
retrain the trained machine learning model based on the response.

19. The non-transitory computer-readable medium of claim 15, wherein the one or more instructions, that cause the one or more processors to receive the real-time productivity data, cause the one or more processors to:
receive the real-time productivity data from a plurality of user devices that the workers use in completing the current tasks, and
wherein the real-time productivity data specifies at least one of:
a quantity of tasks completed, or
a quantity of tasks left to be completed.

20. The non-transitory computer-readable medium of claim 15, wherein the instructions further comprise:
one or more instructions that, when executed by the one or more processors, cause the one or more processors to:
separate historical productivity data and historical skills data into a training set, a validation set, and a test set;
generate the trained machine learning model using the training set;
test the trained machine learning model using the test set; and
validate predicted results of the trained machine learning model using the validation set.

* * * * *